(12) United States Patent
Kurumatani et al.

(10) Patent No.: US 6,882,499 B2
(45) Date of Patent: Apr. 19, 2005

(54) MAGNETIC RECORDING/REPRODUCING DEVICE

(75) Inventors: Hiroshi Kurumatani, Hyogo (JP); Koichiro Hirabayashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 243 days.

(21) Appl. No.: 10/158,556

(22) Filed: May 30, 2002

(65) Prior Publication Data

US 2002/0181146 A1 Dec. 5, 2002

(30) Foreign Application Priority Data

Jun. 4, 2001 (JP) ........................................ 2001-168003

(51) Int. Cl.⁷ .............................................. G11B 15/00
(52) U.S. Cl. ...................................................... 360/96.5
(58) Field of Search ........................................ 360/96.5

(56) References Cited

U.S. PATENT DOCUMENTS 5,781,364 A * 7/1998 Hashimoto et al. ...... 360/78.05
6,052,358 A * 4/2000 Morikawa et al. .......... 369/219
6,205,109 B1 * 3/2001 Furukawa et al. .......... 369/219
2002/0184760 A1 * 12/2002 Babin et al. .................. 29/888

* cited by examiner

Primary Examiner—William Korzuch
Assistant Examiner—Mark Blouin
(74) Attorney, Agent, or Firm—Renner, Otto, Boiselle & Sklar, LLP

(57) ABSTRACT

A magnetic recording/reproducing device of the present invention includes: a loading motor for driving a mechanism section; a holder section for maintaining the loading motor at a prescribed position; a worm gear rotatable along with a rotation shaft of the loading motor; and a worm gear bearing member integrally formed with the holder section, the worm gear bearing member being in contact with a tip of the worm gear, the worm gear bearing member includes a first deflection portion deflectable along a thrust direction along a rotation axis of the worm gear and a second deflection portion deflectable along a radial direction to the rotation axis of the worm gear, and force is generated at the tip of the worm gear along the thrust direction thereof by simultaneously deflecting the first and second deflection portions so as to define a position of the worm gear along the thrust direction thereof.

4 Claims, 8 Drawing Sheets

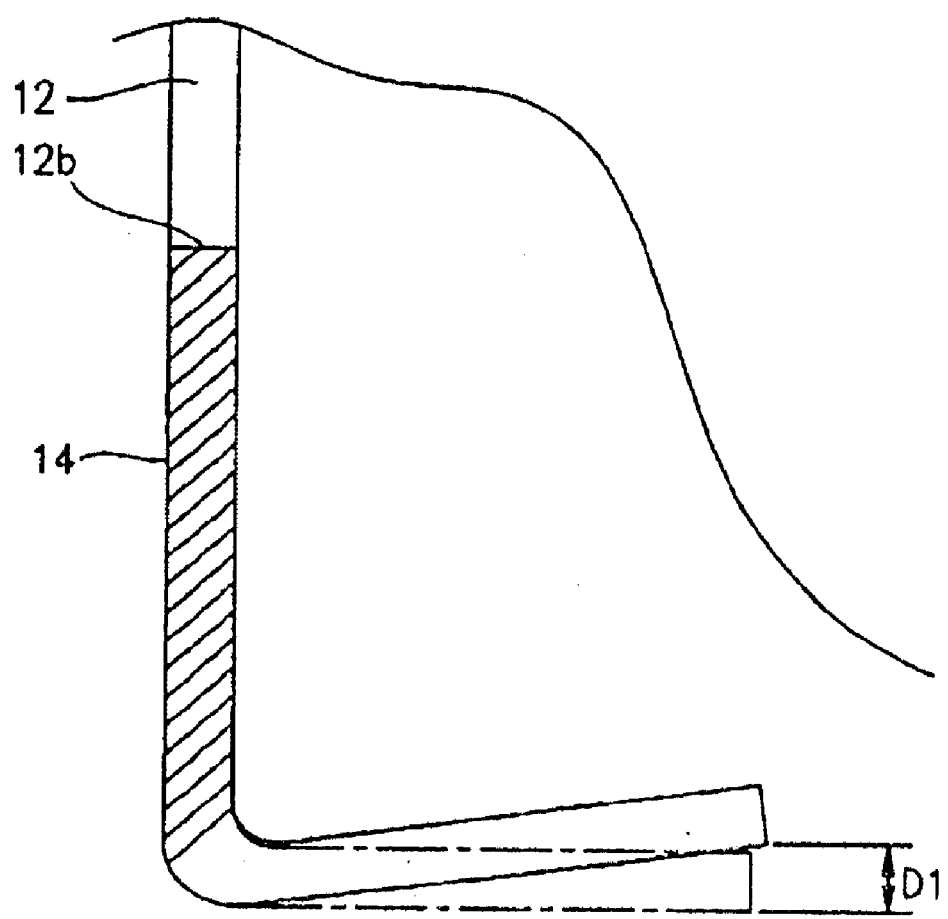

Conventional Art

Conventional Art

MAGNETIC RECORDING/REPRODUCING DEVICE

BACKGROUND OF THE INVENTION

1. Field of the Invention

The present invention relates to a magnetic recording/reproducing device including a speed reducer for driving a mechanism section of the magnetic recording/reproducing device which is provided with a worm gear and a worm gear bearing for defining the position of the worm gear.

2. Description of the Related Art

Recently, speed reducers for use in a magnetic recording/reproducing device are beginning to use less (operational) parts so as to realize reduction in size and production cost of the magnetic recording/reproducing device. In order to provide a speed reducer which maintains a high speed reduction ratio while using a small number of parts, it is necessary to provide a worm gear in the speed reducer. The worm gear, as commonly known in the art of magnetic recording/reproducing devices, maintains a high speed reduction ratio by shifting a gear down to a speed of a next lowest gear.

A speed reducer of a conventional magnetic recording/reproducing device will now be described.

FIG. 4 is a structural view showing a loading motor section of a speed reducer 400 of a conventional magnetic recording/reproducing device. FIG. 5 is a magnified view of a thrust bearing of the conventional speed reducer. FIG. 6 is a view for explaining the shape and size of the conventional thrust bearing.

In FIG. 4, the speed reducer 400 includes a loading motor 1, a loading motor shaft 1a, a holder 2, a worm gear 3 and a worm gear bearing 4. The loading motor 1 is coupled to the loading motor shaft 1a so as to rotate the loading motor shaft 1a about a dotted line denoted by reference numeral 401 (hereinafter, referred to as the "rotation center line 401"). The loading motor shaft 1a receives rotation output provided by the rotation of the loading motor 1. The holder (holder section) 2 holds and defines a position of the loading motor 1 within a chassis (not shown) in which the loading motor 1 is mounted. The holder 2 has a retaining member 2a for holding and retaining the loading motor 1 in the position defined by the holder 2 so as to prevent the loading motor 1 from being separated from (i.e., falling out of) the holder 2. The worm gear 3 is coaxially provided on the loading motor shaft 1a. The worm gear bearing 4 is integrally formed with the holder 2. The worm gear bearing 4 receives a worm gear tip 3a and defines a position of the worm gear 3 for reliable and effective operation thereof.

The operation of the conventional speed reducer 400 of the conventional magnetic recording/reproducing device is described below.

Referring to FIG. 4, the loading motor shaft 1a is rotated by applying a voltage to the loading motor 1. This rotates the worm gear 3 coaxially provided on the loading motor shaft 1a. The worm gear 3 transmits the rotation to a worm wheel (not shown) which is a speed reduction element coupled to the worm gear 3. By this mechanism, the rotation of the worm gear 3 is transmitted to other operational elements included in the speed reducer, thereby driving a mechanism section of the conventional magnetic recording/reproducing device. A specific description of this rotation transmission is omitted herein for brevity.

Next, operation of the conventional thrust bearing (i.e., worm gear bearing 4) is described. The (rotation) force transmitted to the worm gear 3 causes the worm gear 3 to be inclined to move along a thrust direction thereof (i.e., downward with respect to the plane of FIG. 4, and more specifically along a direction of the rotation axis of the worm gear 3) by degrees of a torsion angle of the worm gear 3. This force is denoted by F shown in FIG. 4. The worm gear bearing 4 receives force F applied by the worm gear 3.

Referring to FIG. 5, the relationship between force F3 applied by the worm gear 3 to the worm gear bearing 4 and force F4 applied by the worm gear bearing 4 to the worm gear 3 in response to force F3 is described.

In FIG. 5, reference numeral 4a denotes the position of the worm gear bearing 4 before the loading motor 1 is assembled into the holder 2, and reference numeral 4b denotes the position of the worm gear bearing 4 after the loading motor 1 including the worm gear 3 provided on the loading motor shaft 1a is assembled with the holder 2. In this case, deflection of the worm gear bearing 4 amounts to distance D shown in FIG. 5, and force F4 generated by the worm gear bearing 4 is determined from deflection D.

When the force applied by the worm gear 3 to the worm gear bearing 4 along the thrust direction thereof is represented by F3, force F4 applied by the worm gear bearing 4 to the worm gear 3 in response to force F3 is required to be equal to or more than force F3 in order to maintain a suitable position of the worm gear 3 on the worm gear bearing 4 so that the worm gear bearing 4 defines a suitable position of the worm gear 3 for reliable and effective operation thereof. A relationship between force F4 and force F3 is represented by $F4 \geq F3$.

In the case where forces F3 and F4 have the above relationship, when the worm gear 3 is rotated, movement of the worm gear 3 along the thrust direction thereof does not occur, and thus the rotation of the worm gear 3 is stabilized. Further, load applied to the worm gear 3 and noise, which are produced during the rotation of the worm gear 3, are reduced.

Force F4 generated by the worm gear bearing 4 is determined by the shape, i.e. length L, thickness T, and width W shown in FIG. 6, of the worm gear bearing 4 and deflection D shown in FIG. 5 thereof.

However, in the conventional speed reducer 400, it is difficult to determine these parameters for setting for force F4 generated by the worm gear bearing 4 so as to stabilize the rotation of the worm gear 3 under the above-described condition. Specifically, as magnetic recording/reproducing devices become more compact, there is difficulty in increasing a two-dimensional size, i.e., the length L, width W, etc., of the worm gear bearing 4. Further, if the worm gear bearing 4 is excessively deflected so as to maintain force F4 which is a load, the worm gear bearing 4 undergoes rupture or permanent deformation, and thus deflection D cannot be increased so as to accommodate the necessary force F4. Furthermore, if the thickness T of the worm gear bearing 4 is increased so as to maintain force F4, the position of the worm gear 3 is not settled (stable), so that variance in force F4 becomes greater as the thickness T of the worm gear bearing 4 becomes greater. Further still, if the size of the holder 2 for holding the loading motor 1 is increased to increase force F4, then the effect of providing a compact magnetic recording/reproducing device is lost. If deflection D and the thickness T are further increased, the worm gear bearing 4 undergoes creep deformation under high temperature environments which occur in operation of the magnetic recording/reproducing device, causing a reduction in force F4. In order to solve this problem, it is necessary to increase the length L, decrease deflection D, or increase the overall size of the worm gear bearing 4. Alternatively, it is necessary to select an expensive creep-resistant material for or provide an additional element to the worm gear bearing 4.

SUMMARY OF THE INVENTION

According to one aspect of the present invention, there is provided a magnetic recording/reproducing device including: a loading motor for driving a mechanism section;

a holder section for maintaining the loading motor at a prescribed position in a chassis; a worm gear rotatable along with a rotation shaft of the loading motor; and a worm gear bearing member integrally formed with the holder section, the worm gear bearing member being in contact with a tip of the worm gear, the worm gear bearing member includes a first deflection portion deflectable along a thrust direction along a rotation axis of the worm gear and a second deflection portion deflectable along a radial direction to the rotation axis of the worm gear, and force is generated at the tip of the worm gear along the thrust direction of the worm gear by simultaneously deflecting the first and second deflection portions of the worm gear bearing member so as to define a position of the worm gear along the thrust direction thereof.

In one embodiment of this invention, the relationship between a length L1 of the first deflection portion and a length L2 of the second deflection portion is represented by L2>0.5×L1.

In one embodiment of this invention, the relationship between a width W1 of the first deflection portion and a width W2 of the second deflection portion is represented by W2<3×W1.

In one embodiment of this invention, the worm gear bearing member is made of a resin material.

Thus, the invention described herein makes possible the advantages of providing: (1) a magnetic recording/reproducing device which includes a thrust bearing mechanism capable of easily stabilizing the rotation of a worm gear; (2) a magnetic recording/reproducing device which includes a thrust bearing mechanism capable of easily stabilizing the rotation of a worm gear and being used with a compact magnetic recording/reproducing device; (3) a magnetic recording/reproducing device which includes a cost-efficient, high-durability and creep-resistant thrust bearing mechanism capable of increasing the degree of freedom for material selection and easily stabilizing the rotation of a worm gear; and (4) a magnetic recording/reproducing device which includes a thrust bearing mechanism capable of increasing deflection of a worm gear member, facilitating adjustments for dimensional unevenness and easily stabilizing the rotation of the worm gear.

These and other advantages of the present invention will become apparent to those skilled in the art upon reading and understanding the following detailed description with reference to the accompanying figures.

BRIEF DESCRIPTION OF THE DRAWINGS

FIG. 2(b) is a magnified view of a part of the loading motor section of the speed reducer of the magnetic recording/reproducing device of FIG. 1;

DESCRIPTION OF THE EMBODIMENTS

Figure 2A:
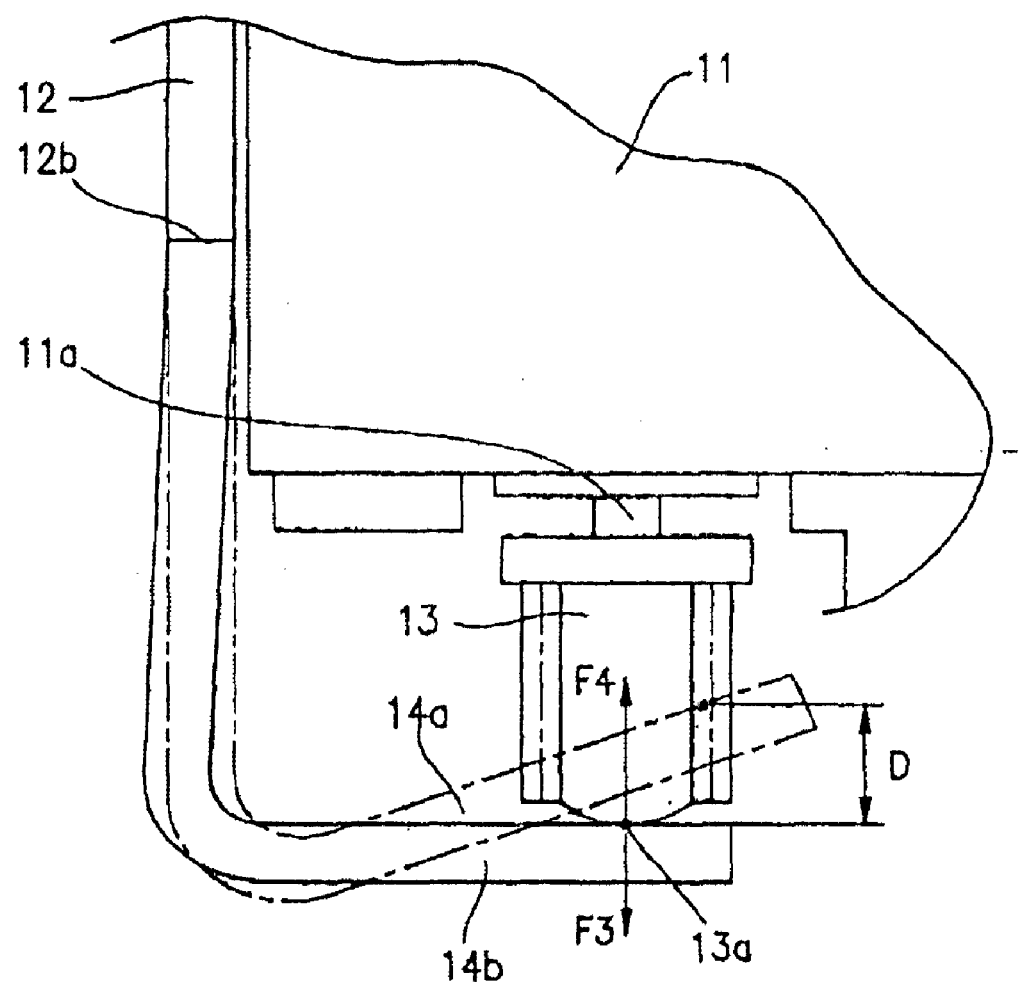
FIG. 2(a) is a magnified view of a part of the loading motor section of the speed reducer of the magnetic recording/reproducing device of FIG. 1.
Figure 2C:
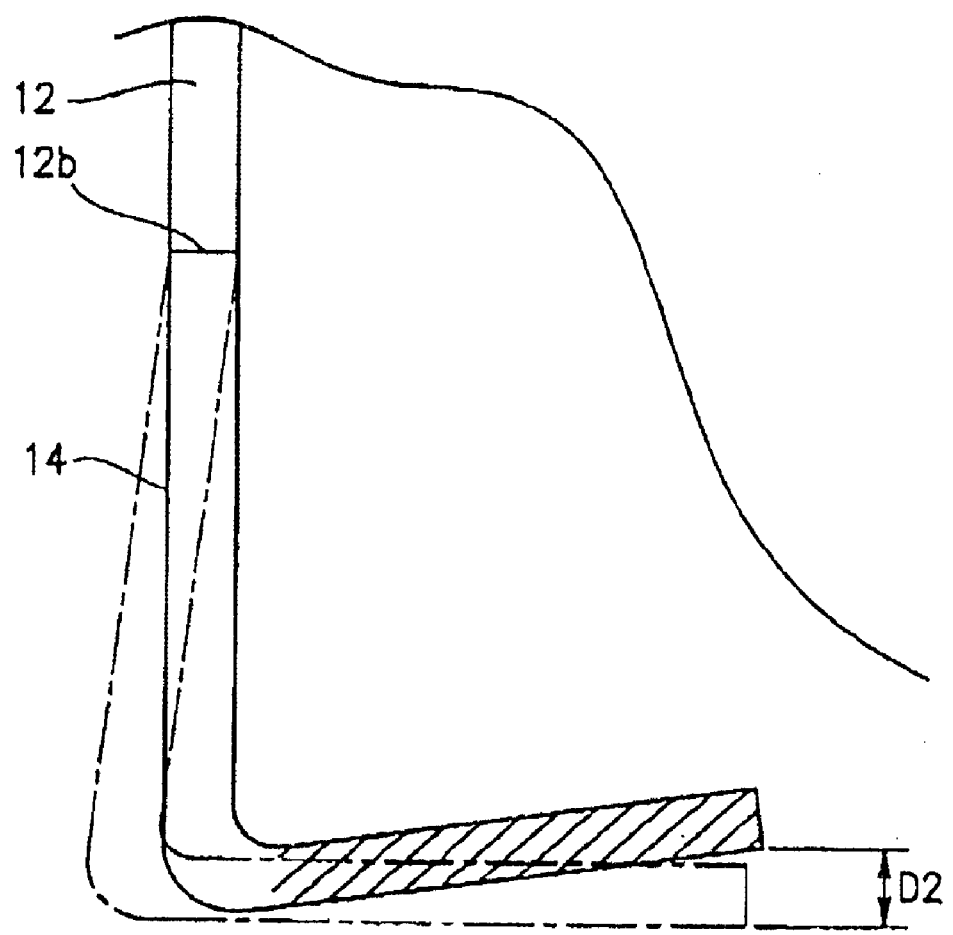
FIG. 2(c) is a magnified view of a part of the loading motor section of the speed reducer of the magnetic recording/reproducing device of FIG. 1.
Figure 3:
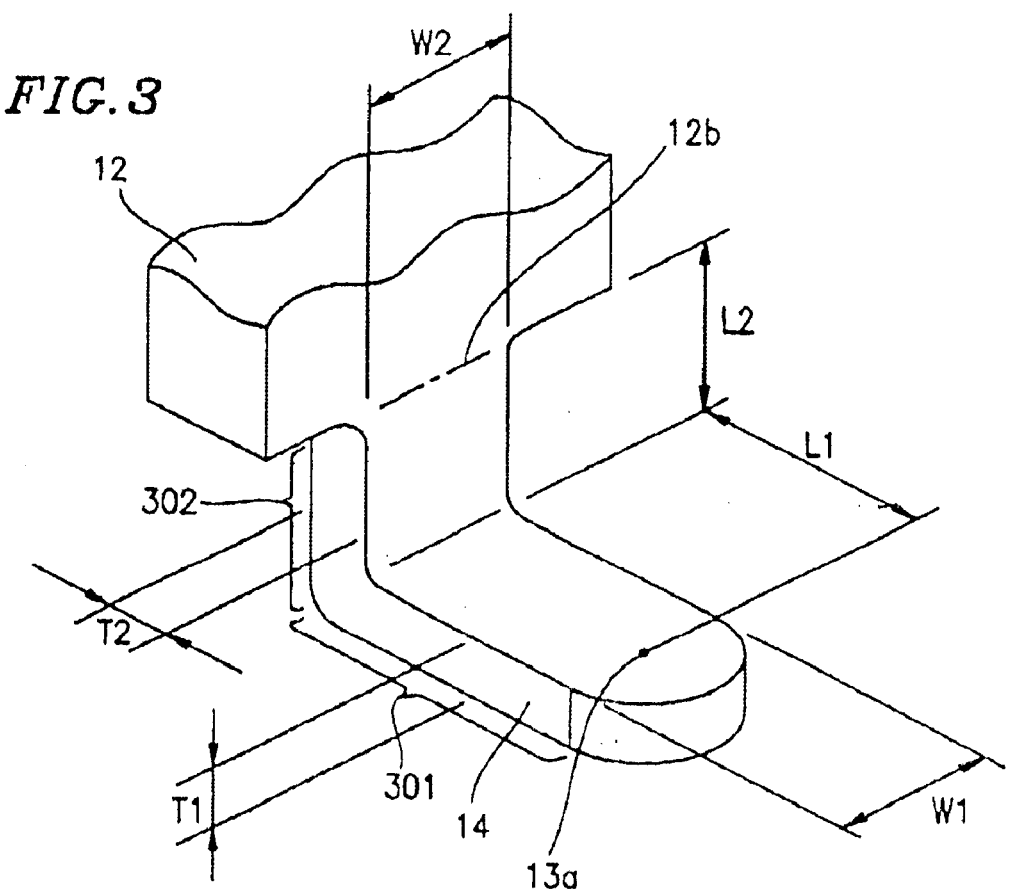
FIG. 3 is a structural view showing a thrust bearing mechanism of the loading motor section of the speed reducer of the magnetic recording/reproducing device of FIG. 1.
Figure 4:
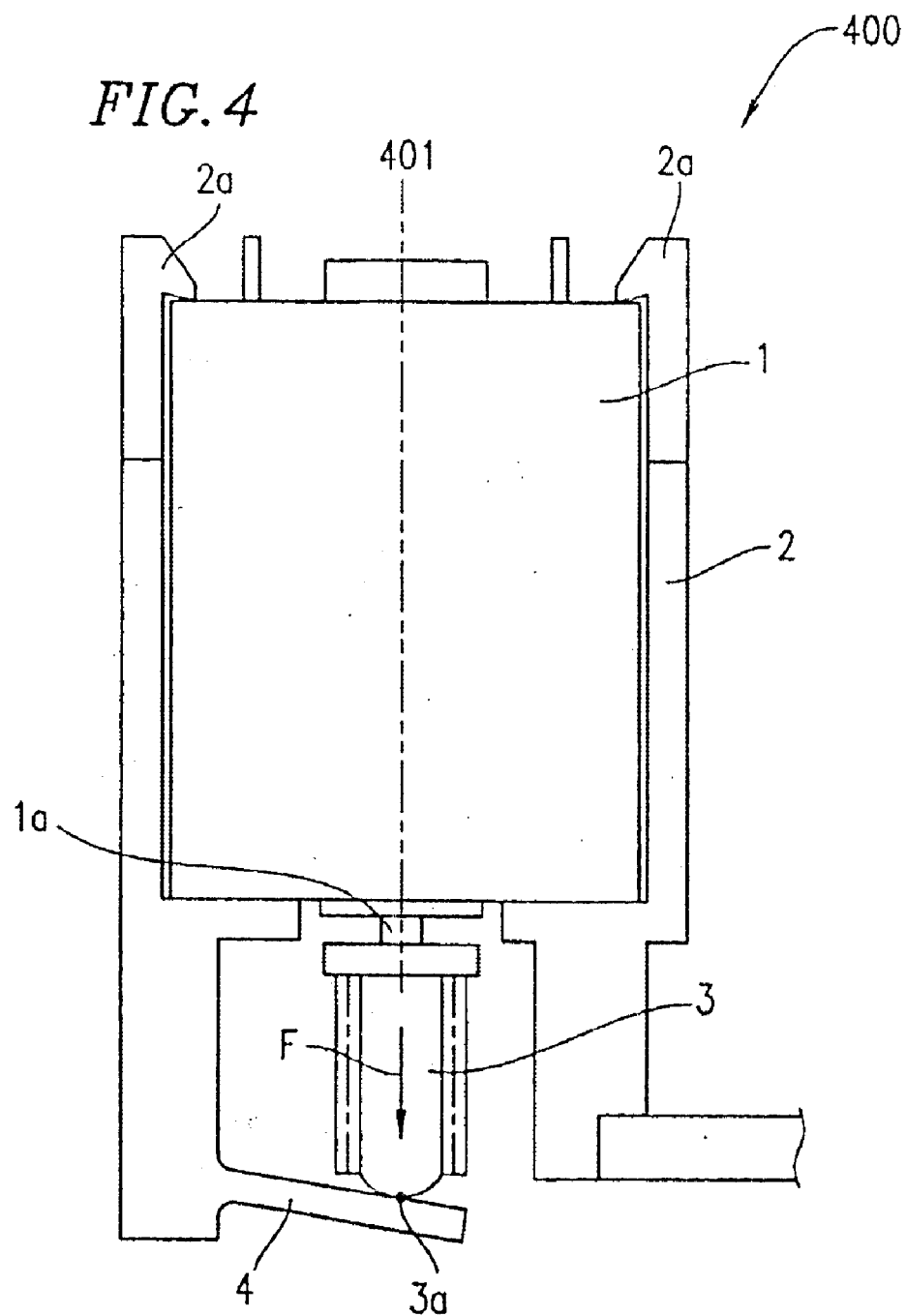
FIG. 4 is a structural view showing a loading motor section of a conventional speed reducer of a conventional magnetic recording/reproducing device.

Hereinafter, examples of the present invention will be described with reference to FIGS. 1 through 3.

EXAMPLE 1

Figure 1:
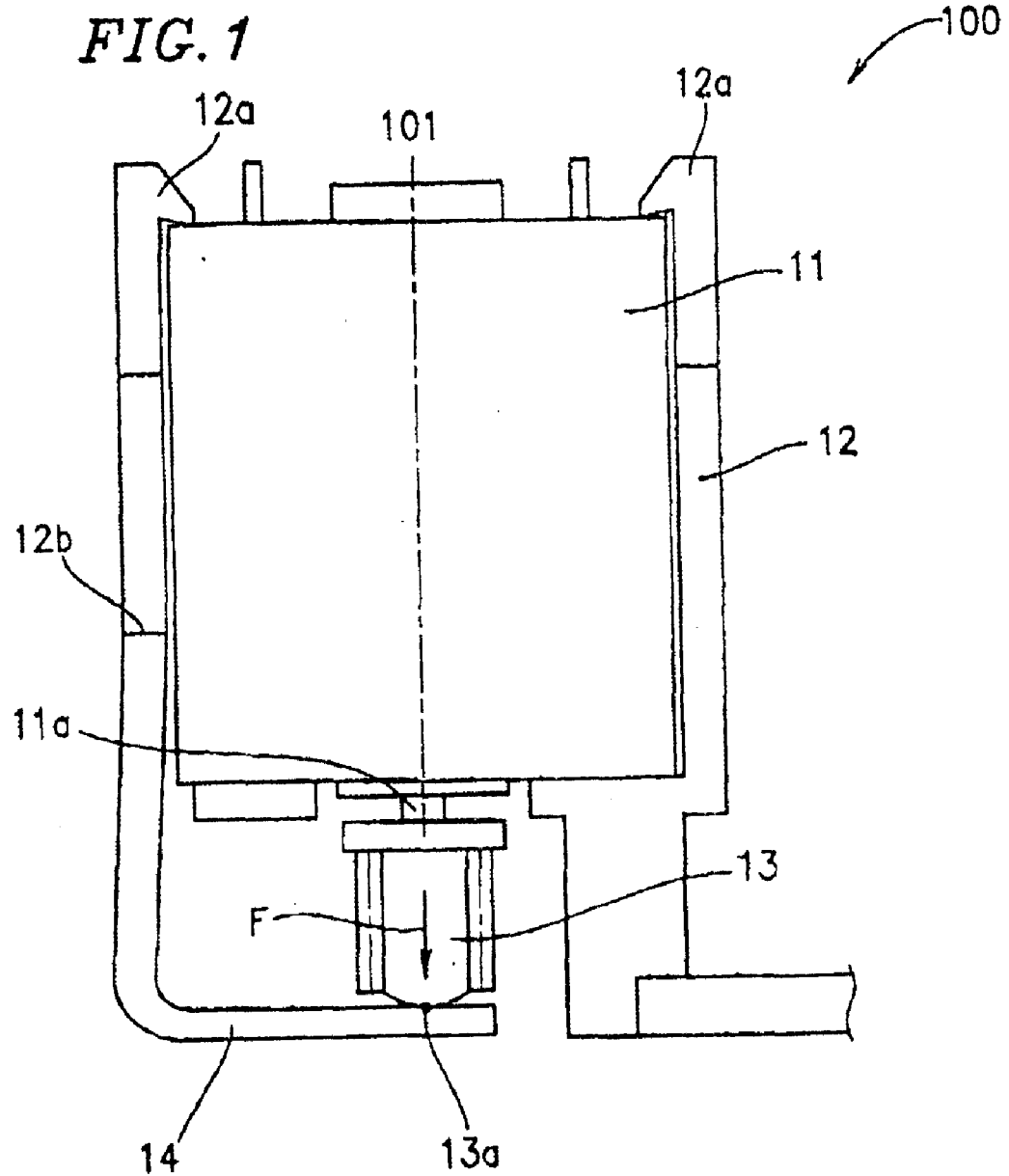
FIG. 1 is a structural view of a loading motor section of a speed reducer of a magnetic recording/reproducing device according to Example 1 of the present invention.

FIG. 1 is a structural view of a loading motor section of a speed reducer 100 of a magnetic recording/reproducing device according to Example 1 of the present invention. FIGS. 2(a)–(c) are magnified views each illustrating a part of the loading motor section of the speed reducer of the magnetic recording/reproducing device of FIG. 1. FIG. 3 is a view for explaining the shape and size of a thrust bearing mechanism of the speed reducer of the magnetic recording/reproducing device of FIG. 1.

In FIG. 1, the speed reducer 100 includes a loading motor 11, a loading motor shaft 11a, a holder 12, a worm gear 13 and a worm gear bearing 14. The loading motor 11 is coupled to the loading motor shaft 11a so as to rotate the loading motor shaft 11a about a dotted line denoted by reference numeral 101 (hereinafter, referred to as the "rotation center line 101"). The loading motor shaft 11a receives rotation output provided by the rotation of the loading motor 11. The holder (holder section) 12 holds and defines a position of the loading motor 11 within a chassis (not shown) in which the loading motor 11 is mounted. The holder 12 has a retaining member 12a for holding and retaining the loading motor 11 in the position defined by the holder 12 so as to prevent the loading motor 11 from being separated from (i.e., falling out of) the holder 12. The worm gear 13 is coaxially provided on the loading motor shaft 11a. The worm gear bearing 14 is integrally formed with the holder 12. The worm gear bearing 14 receives a worm gear tip 13a and defines a position of the worm gear 13. Reference numeral 12b denotes a portion of the worm gear bearing 14 from which deflection of the worm gear bearing 14 occurs, i.e., portion of the worm gear bearing 14 below the portion 12b is deflected through contact with the tip 13a of the worm gear 13.

Operation of the speed reducer 100 of the magnetic recording/reproducing device according to Example 1 of the present invention is described below.

Referring to FIG. 1, the loading motor shaft 11a is rotated by applying a voltage to the loading motor 11. This rotates the worm gear 13 coaxially provided on the loading motor shaft 11a. The worm gear 13 transmits the rotation to a worm wheel (not shown) which is a speed reduction element coupled to the worm gear 13. By this mechanism, the rotation of the worm gear 13 is transmitted to other operational elements included in the speed reducer, thereby driving a mechanism section of the magnetic recording/ reproducing device. A specific description of this rotation transmission is omitted herein for brevity.

Next, operation of the thrust bearing (i.e., worm gear bearing 14) according to Example 1 of the present invention is described. The (rotation) force transmitted to the worm gear 13 causes the worm gear 13 to be inclined to move along a thrust direction thereof (i.e., downward with respect to the plane of FIG. 1, and more specifically along a direction of the rotation axis of the worm gear 13) by degrees of a torsion angle of the worm gear 13. This force is denoted by F shown in FIG. 1. The worm gear bearing 14 receives force F applied by the worm gear 13.

Referring to FIGS. 2(a)–2(c), the relationship between force F3 applied by the worm gear 13 to the worm gear bearing 14 and the force F4 applied by the worm gear bearing 14 to the worm gear 13 in response to force F3 is described.

In FIG. 2(a), reference numeral 14a denotes the position of the worm gear bearing 14 before the loading motor 11 is assembled into the holder 12, and reference numeral 14b denotes the position of the worm gear bearing 14 after the loading motor 11 including the worm gear 13 provided on the loading motor shaft 11a is assembled with the holder 12. In this case, deflection D of the worm gear bearing 14 is a combination of deflection D1 of the worm gear bearing 14 along a thrust direction of the worm gear 13 shown in FIG. 2(b) and deflection D2 of the worm gear bearing 14 along a radial direction of the worm gear 13 shown in FIG. 2(c). Therefore, force F4 generated by the worm gear bearing 14 is determined from deflection D. In FIG. 2(b), distortion of the hatched area is not considered as being included in deflection D1 of the worm gear bearing 14 along the thrust direction of the worm gear 13. In FIG. 2(c), distortion of the hatched area is not considered as being included in deflection D2 of the worm gear bearing 14 along the thrust direction of the worm gear 13. For simplification of the drawings, only part of the holder 12 and the worm gear bearing 14 are shown in each of FIGS. 2(b) and 2(c).

When the force generated by the worm gear 13 along the thrust direction thereof is represented by F3, force F4 generated by the worm gear bearing 14 is required to be equal to or more than force F3 in order to maintain a position of the worm gear 13 on the worm gear bearing 14 so that the worm gear bearing 14 defines a suitable position of the worm gear 13 for reliable and effective operation thereof. A relationship between force F4 and force F3 is represented by F4≧F3.

The force F4 generated by the worm gear bearing 14 is determined by the shape of the worm gear bearing 14. That is, length L1, thickness T1, and width W1 shown in FIG. 3 of a first deflection portion 301 of the worm gear bearing 14 deflectable along the thrust direction of the worm gear 13 and deflection D1 shown in FIG. 2(b) of the first deflection portion 301, and length L2, thickness T2, and width W2 shown in FIG. 3 of a second deflection portion 302 of the worm gear bearing 14 deflectable along a radial direction of the worm gear 13 (i.e., a direction perpendicular to the thrust direction of the worm gear 13, and more specifically in a direction radial to the rotation axis of the worm gear 13) and deflection D2 shown in FIG. 2(c) of the second deflection portion. The deflection D of the worm gear bearing 14 is represented by D=D1+D2.

According to the present invention, by configuring the worm gear bearing 14 such that the first and second deflection portions 301 and 302 are simultaneously deflected, force F4 is applied by the worm gear bearing 14 to the tip 13a of the worm gear 13 along the thrust direction of the worm gear 13 so as to define a suitable position of the worm gear 13 along the thrust direction thereof. A preferable relationship between length L1 of the first deflection portion 301 and length L2 of the second deflection portion 302 is L2>0.5×L1. A preferable relationship between width W1 of the first deflection portion 301 and width W2 of the second deflection portion 302 is W2<3×W1. When the first and second deflection portions 301 and 302 satisfy these requirements, the rotation of the worm gear 13 is most stabilized.

In this state, when the worm gear 13 is rotated, the movement of the worm gear 13 along the thrust direction thereof does not occur, and thus the rotation of the worm gear 13 is stabilized. Further, load applied to the worm gear 13 and noise, which are produced during the rotation of the worm gear 13, are reduced.

According to the present invention, by configuring the worm gear bearing 14 so as to be deflected along both thrust and radial directions of the worm gear 13, it is possible to easily increase the length and deflection of a deflection portion to L1+L2 and D1+D2, respectively. Therefore, force F4 can be increased without increasing a size of the holder 12 integrally formed with the worm gear bearing 14.

Further, the worm gear bearing 14 is provided with the portion 12b, such that deflection of the worm gear bearing 14 starts away from a portion where the worm gear bearing 14 is in contact with the worm gear 13 (i.e., the deflection occurs at the side of the worm gear bearing 14, which is closer to the loading motor 11), whereby it is possible to increase the length of the deflection portion to several times the length of a deflection portion of a conventional speed reducer without increasing the deflection or thickness thereof, thereby increasing the length of the worm gear bearing 14 so as to attain the necessary force F4. Since the length of the worm gear bearing 14 is increased, the worm gear bearing 14 is not subject to creep deformation caused by high temperature environments, whereby it is possible to use inexpensive molding resin material, such as Duracon™, for the worm gear bearing 14 without considering whether the material is resistant to creep deformation, thereby improving cost efficiency of the worm gear bearing 14.

Furthermore, the degree of freedom for design of the worm gear bearing 14 is increased, i.e., a range of selection of the shape and materials of the worm gear bearing 14 is increased as compared to the conventional worm gear bearing, whereby it is possible to select a material for the worm gear bearing 14, for example, in view of durability against friction between the worm gear bearing 14 and the worm gear 13. Thus, the speed reducer according to the present invention is provided with high durability.

Figure 5:
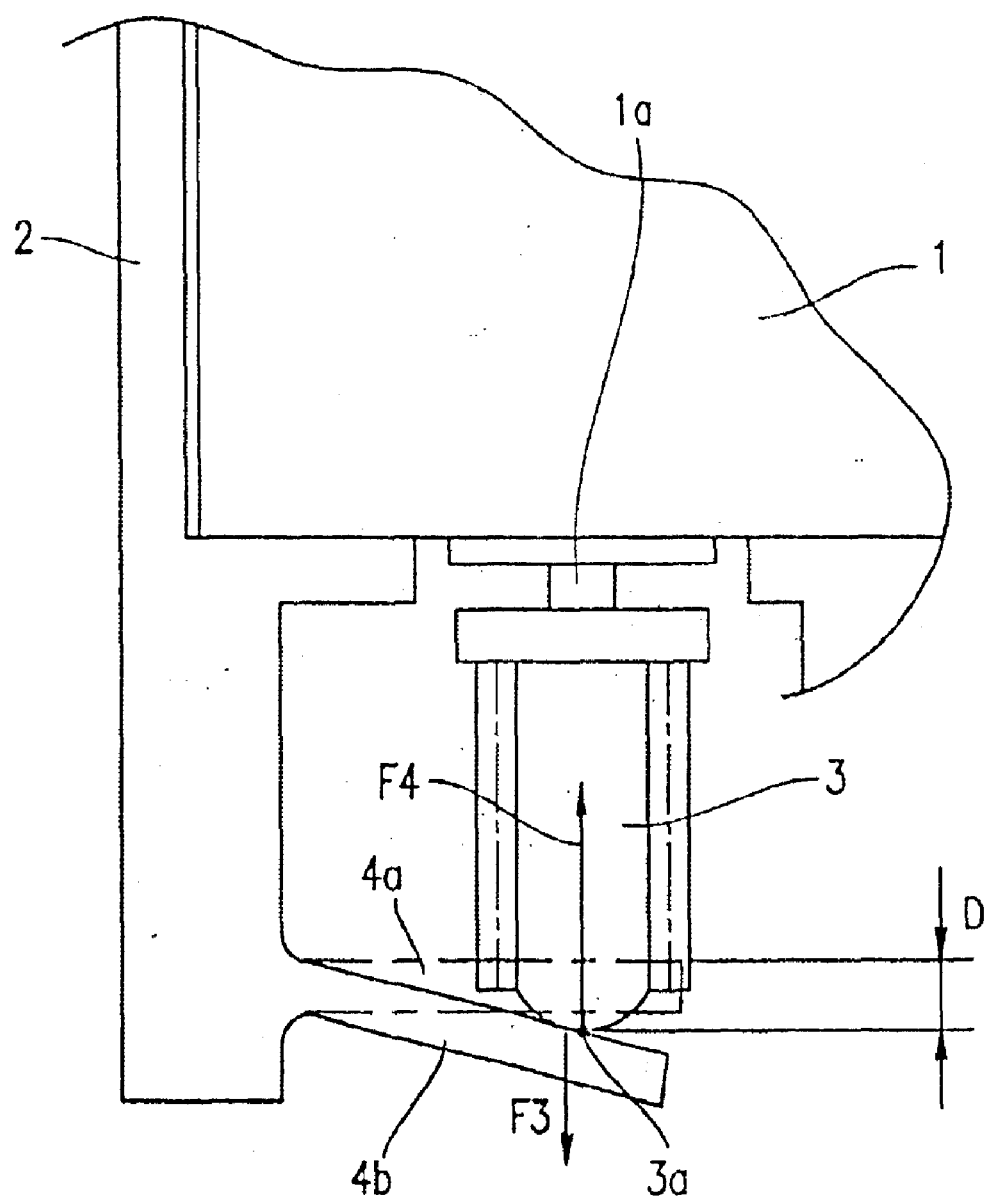
FIG. 5 is a magnified view of a thrust bearing mechanism of the conventional speed reducer of FIG. 4.
Figure 6:
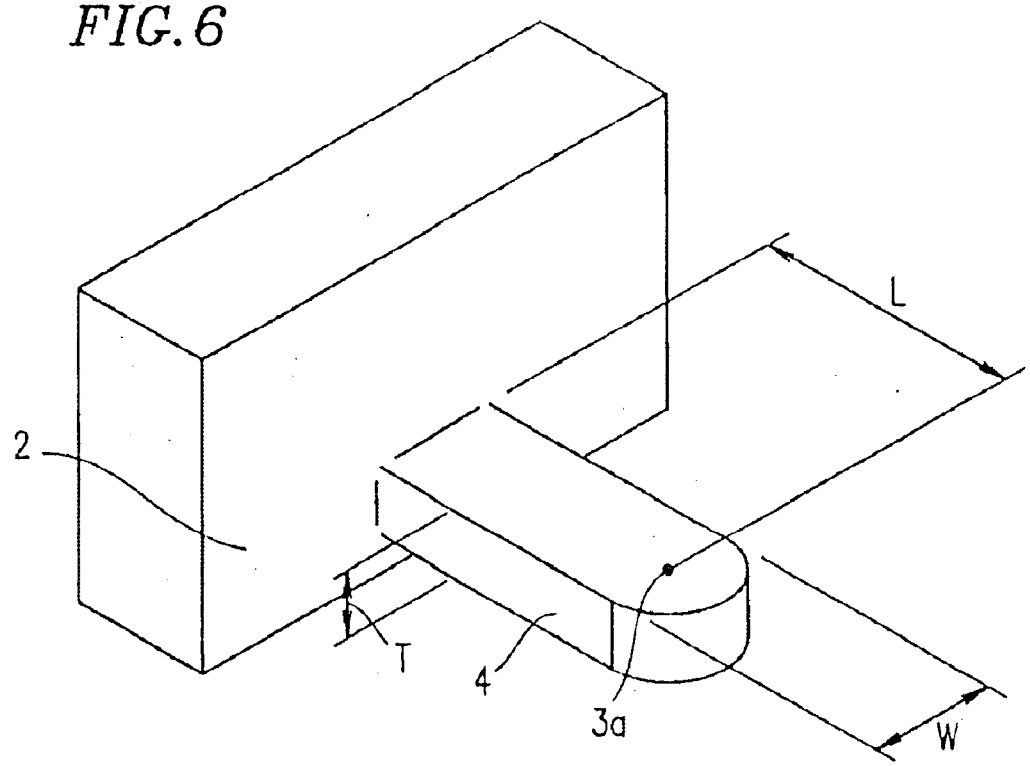
FIG. 6 is a view for explaining the shape and size of the thrust bearing mechanism of the conventional speed reducer of FIG. 4.

Further still, it is possible to increase deflection of the worm gear bearing 14. Accordingly, when the necessary force F4 applied by the conventional worm gear bearing 4 (FIG. 5) and the necessary force F4 applied by the worm gear bearing 14 (FIG. 2(a)) are equal to each other, a spring constant of the worm gear bearing 14 is smaller than that of the worm gear bearing 4. Therefore, it is not necessary to position the worm gear 13 on the worm gear bearing 14 with high precision as required for the conventional worm gear 3 (FIG. 3), thereby reducing the number of steps required for producing the magnetic recording/reproducing device of the present invention.

As described above, a worm gear bearing member according to the present invention can be configured so as to be deflected along both thrust and radial directions of a worm gear, whereby it is possible to attain necessary force (i.e., force applied by the worm gear bearing member in response to force applied by the worm gear) without significantly deflecting the worm gear bearing member. Therefore, the rotation of the worm gear is stabilized.

Thus, the degree of freedom for design of the worm gear bearing member is increased, i.e., the length and deflection of the worm gear bearing member can be flexibly determined, so that a range of selection of materials used for the worm gear beating member is greater than compared to the conventional bearing, whereby it is possible to select a material for the worm gear bearing member, for example, in view of durability against friction between the worm gear bearing member and the worm gear. Thus, the speed reducer according to the present invention is provided with high durability.

Further, the length of the worm gear bearing member can be increased, and thus the worm gear bearing member is not subject to creep deformation of the worm gear bearing member when the gearing member is left in high temperature environments. Thus, an inexpensive resin material can be used instead of using an expensive creep-resistant material as is conventional.

Furthermore, deflection of the worm gear bearing member can be increased. Thus, high tolerance is allowed for providing the worm gear on a loading motor shaft so as to assemble a speed reducer, thereby facilitating easy assembly of the speed reducer.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording/reproducing device, comprising:

a loading motor for driving a mechanism section;

a holder section for maintaining the loading motor at a prescribed position in a chassis;

a worm gear rotatable along with a rotation shaft of the loading motor; and a worm gear bearing member integrally formed with the holder section, the worm gear bearing member being in contact with a tip of the worm gear, wherein the worm gear bearing member includes a first deflection portion generally perendicular to a rotation axis of the worm gear and a second deflection portion generally parallel to a rotation axis of the worm gear, and force is generated at the tip of the worm gear along the thrust direction of the worm gear by simultaneously deflecting the first and second deflection portions of the worn gear bearing member so as to define a position of the worm gear along the thrust direction thereof.

2. A magnetic recording/reproducing device according to claim 1, wherein the relationship between a length L1 of the first deflection portion and a length L2 of the second deflection portion is represented by L2>0.5×L1.

3. A magnetic recording/reproducing device according to claim 1, wherein the relationship between a width W1 of the first deflection portion and a width W2 of the second deflection portion is represented by W2<3×W1.

4. A magnetic recording/reproducing device according to claim 1, wherein the worm gear bearing member is made of a resin material.

* * * * *